US012152369B1

(12) United States Patent
Westendorf et al.

(10) Patent No.: US 12,152,369 B1
(45) Date of Patent: Nov. 26, 2024

(54) SPRING-BIASED GRAPPLING ASSEMBLIES

(71) Applicant: Westendorf Manufacturing Co.. Inc., Onawa, IA (US)

(72) Inventors: Matthew N. Westendorf, Onawa, IA (US); Neal W. Westendorf, Onawa, IA (US)

(73) Assignee: Westendorf Manufacturing Co., Inc., Onawa, IA (US)

( * ) Notice: Subject to any disclaimer, the term of this patent is extended or adjusted under 35 U.S.C. 154(b) by 0 days.

(21) Appl. No.: 18/641,500

(22) Filed: Apr. 22, 2024

Related U.S. Application Data

(60) Provisional application No. 63/502,719, filed on May 17, 2023.

(51) Int. Cl.
*E02F 3/96* (2006.01)
*B66F 9/18* (2006.01)

(52) U.S. Cl.
CPC . *E02F 3/96* (2013.01); *B66F 9/18* (2013.01)

(58) Field of Classification Search
CPC ... E02F 3/96; B66F 9/18; B66C 1/585; A01G 23/00
See application file for complete search history.

(56) References Cited

U.S. PATENT DOCUMENTS

| | | | | | |
|---|---|---|---|---|---|
| 966,676 | A * | 8/1910 | Farrell | A22B 5/06 | 452/190 |
| 2,560,863 | A * | 7/1951 | Hearn | B66C 1/58 | 294/109 |
| 3,248,145 | A * | 4/1966 | Diamond | B66C 1/64 | 294/110.1 |
| 3,549,029 | A * | 12/1970 | Rutter | B60P 3/41 | 280/402 |
| 3,954,194 | A * | 5/1976 | Stedman | B60P 1/5433 | 294/902 |
| 4,854,812 | A | 8/1989 | Smith | | |
| 8,221,049 | B1 | 7/2012 | Westendorf | | |
| 10,414,633 | B1 | 9/2019 | Westendorf | | |
| 10,815,100 | B1 | 10/2020 | Westendorf | | |
| 2008/0115490 | A1 | 5/2008 | Langenfeld | | |
| 2009/0304486 | A1 | 12/2009 | Bricker | | |
| 2010/0189535 | A1* | 7/2010 | Nye | E02F 3/3663 | 414/723 |
| 2015/0275465 | A1* | 10/2015 | Zimmerman | E02F 3/404 | 414/722 |
| 2016/0281318 | A1 | 9/2016 | Perry | | |
| 2016/0281322 | A1 | 9/2016 | Burenga | | |

* cited by examiner

*Primary Examiner* — Stephen A Vu
(74) *Attorney, Agent, or Firm* — Joseph M. Butscher; The Small Patent Law Group, LLC

(57) ABSTRACT

A grappling assembly is configured to connect to one or more arms of a utility component. The grappling assembly includes a first claw, a second claw, one or more pivot couplings, and one or more springs coupled to one or more of the first claw, the second claw, or the one or more pivot couplings.

21 Claims, 16 Drawing Sheets

SPRING-BIASED GRAPPLING ASSEMBLIES

CROSS-REFERENCE TO RELATED APPLICATIONS

This application is a non-provisional conversion of, and claims priority to, U.S. Provisional Patent Application No. 63/502,719, filed May 17, 2023, which is incorporated by reference in its entirety.

FIELD OF THE DISCLOSURE

Examples of the present disclosure generally relate to grappling assemblies that may be attached to utility components.

BACKGROUND OF THE DISCLOSURE

Work or utility vehicles, such as tractors, skid steers, four wheelers, bulldozers, and the like, are often adapted to be used with various types of attachments. For example, loaders may be attached to the front of such equipment with arms and hydraulic controls that allow the loader to be raised and lowered, and also rolled forward and backward. Many different implements may be attached to the front of the work vehicles, thereby allowing an operator to accomplish various tasks via a single work vehicle.

Conventional front-end loaders include a pair of lifting arms or boom assemblies that include towers or rearward ends that pivotally attach to a tractor, and lifting arms or forward ends that pivotally attach to an implement. A coupler may be used to connect various implements to the lifting arms. As such, the owner of a work vehicle may change the implement attached to the work vehicle in order to address the needs of a particular job. Exemplary implements found on conventional front-end loaders include buckets, clam shells, plows, fork lifts, bale spears, and the like.

Generally, the arms of the loader and the attached implement may be controlled by a hydraulic system. Hydraulic cylinders may be configured to operate front-end loaders and their attached implements. Hydraulic lines may extend along an exterior (or routed along the interior) of the front-end loaders for powering the hydraulic cylinders.

Known attachments, such as grapplers, are typically connected to a boom assembly through a complicated linkage. Further, multiple actuating cylinders are typically connected to known grapplers in order to move grappling jaws with respect to one another. For example, a first hydraulic cylinder is operatively attached to an upper jaw, while a second hydraulic cylinder is operatively attached to a lower jaw. The use of multiple actuating cylinders may add time and cost to a manufacturing process.

SUMMARY OF THE DISCLOSURE

A need exists for an efficient and effective grappling assembly that can be quickly and easily coupled to one or more arms of a utility component. Further, a need exists for a grappling assembly configured to resiliently grasp various structures.

With those needs in mind, certain examples of the present disclosure provide a grappling assembly configured to connect to one or more arms of a utility component. The grappling assembly includes a first claw, a second claw, one or more pivot couplings, and one or more springs coupled to one or more of the first claw, the second claw, or the one or more pivot couplings.

In at least one example, the one or more pivot couplings pivotally couple the first claw to the second claw, and the one or more springs are coupled to the one or more pivot couplings.

In at least one example, the one or more pivot couplings pivotally couple a first portion of the first claw to a second portion of the first claw, and the one or more springs are coupled to the one or more pivot couplings.

In at least one example, the one or more pivot couplings pivotally couple a first portion of the second claw to a second portion of the second claw, and the one or more springs are coupled to the one or more pivot couplings.

In at least one example, the one or more springs include a first spring, a second spring, and a third spring. In at least one further example, the one or more pivot couplings include a first pivot coupling that pivotally couples the first claw to the second claw, wherein the first spring directly couples to the first pivot coupling; a second pivot coupling that pivotally couples a first portion of the first claw to a second portion of the first claw, wherein the second spring directly couples to the second pivot coupling; and a third pivot coupling that couples a first portion of the second claw to a second portion of the second claw, wherein the third spring directly couples to the third pivot coupling.

In at least one example, the grappling assembly is devoid of hydraulics.

In at least one example, the one or more springs include a coiled portion wrapped around a portion of the one or more pivot couplings, a first linear segment forwardly extending from a first end of the coiled portion, and a second linear segment rearwardly extending from a second end of the coiled portion. The one or more springs can include a first spring and a second spring.

In at least one example, one or more rods are coupled to one or both of the first claw or the second claw. The one or more springs can be coupled to one or more portions of the one or more rods. One or more caps can be secured to the one or more rods over the one or more springs. One or more pins can be removably secured to the one or more rods.

Certain examples of the present disclosure provide a method for a grappling assembly configured to connect to one or more arms of a utility component, the method including coupling one or more springs to one or more of a first claw, a second claw, or one or more pivot couplings of the grappling assembly.

Certain examples of the present disclosure provide a grappling assembly configured to connect to one or more arms of a utility component. The grappling assembly includes a first claw, a second claw, a pivot coupling, a first spring directly coupled to the pivot coupling, and a second spring directly coupled to the pivot coupling. Each of the first spring and the second spring includes a coiled portion wrapped around a portion of the pivot coupling, a first linear segment forwardly extending from a first end of the coiled portion, and a second linear segment rearwardly extending from a second end of the coiled portion, wherein the first end is opposite from the second end.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
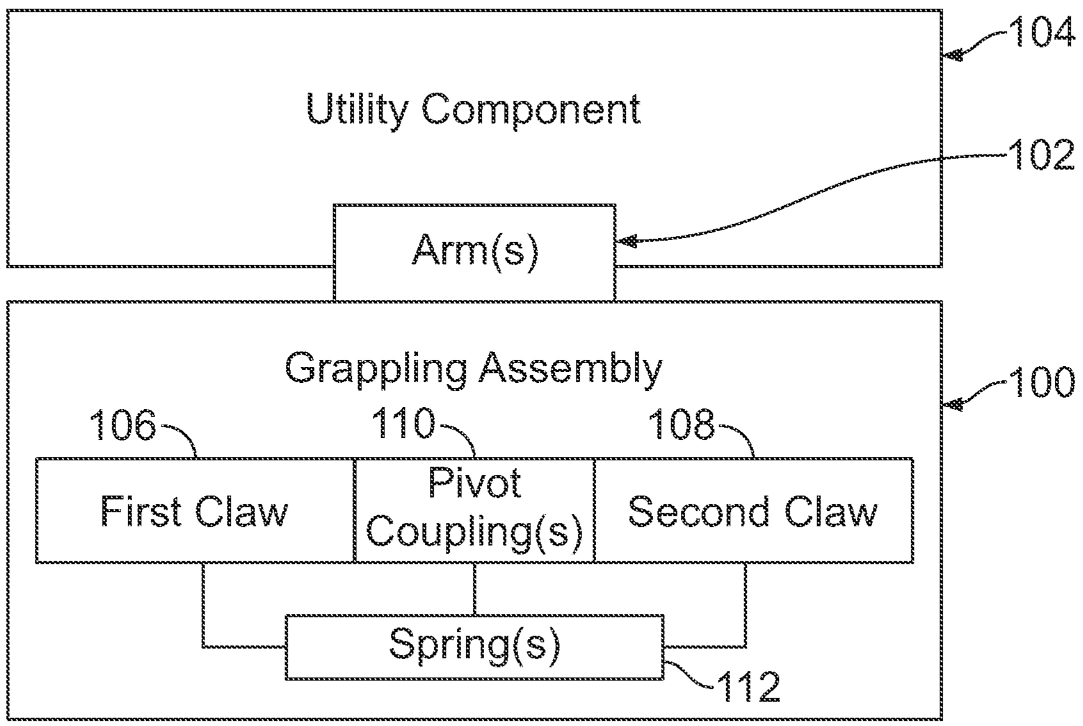
FIG. 1 illustrates a block diagram of a grappling assembly coupled to one or more arms of a utility component, according to an example of the present disclosure.

FIG. 1 illustrates a block diagram of a grappling assembly 100 coupled to one or more arms 102 of a utility component 104, according to an example of the present disclosure. As an example, the utility component 104 can be front loader. As another example, the utility component 104 can be a tractor. As another example, the utility component 104 can be a skid steer. As another example, the utility component 104 can be a forklift. In at least one example, the utility component 104 has a first arm 102 and a second arm 102 on opposite sides. The grappling assembly 100 can be moveably secured to both the first arm 102 and the second arm 102. As another example, the utility component 104 has a single arm 102. As another example, the utility component 104 has three or more arms 102.

In at least one example, the arm(s) 102 are movable. The grappling assembly 100 can be configured to removably connect to the arms(s) 102 of the utility component 104. As another example, the grappling assembly 100 can be permanently secured to the arm(s) 102.

The grappling assembly 100 includes a first claw 106 and a second claw 108. In at least one example, the first claw 106 is moveably coupled to the second claw 108 by one or more pivot couplings 110, such as one or more axles, rods, pins, and/or the like. As another example, a pivot coupling 110 can be on or within one of the first claw 106 or the second claw 108, and configured to allow portions of the first claw 106 or the second claw 108 to pivot in relation to one another.

The grappling assembly 100 also includes one or more springs 112 coupled to one or more of the first claw 106, the second claw 108, and/or the pivot coupling(s) 110. As an example, the spring(s) 112 can be a compression spring. As another example, the spring(s) 112 can be a torsion spring.

In at least one example, a spring 112 can be directly coupled to (such as abutting or otherwise directly connected to) a pivot coupling 110. As another example, a spring 112 can be coupled between the first claw 106 and the second claw 108. In at least one example, the grappling assembly 100 includes multiple springs 112 at various locations.

In operation, the spring(s) 112 exert a spring force into one or more of the first claw 106, the second claw 108, and/or the pivot coupling(s) 110. For example, the spring(s) 112 can be configured to bias the first claw 106 and the second claw 108 into an at-rest position, which can be between a fully-closed position and a fully-open position. As another example, the spring(s) 112 can be configured to bias the first claw 106 and the second claw 108 into the fully-closed position. As another example, the spring(s) 112 can be configured to bias the first claw 106 and the second claw into the fully-open position. As another example, the spring(s) 112 relieve pressure that is caused when clamping force is exerted by the first claw 106 and the second claw 108.

In at least one example, the grappling assembly 100 is operatively connected to the arm(s) 102 of the utility component 104 without any hydraulics. As a further example, the grappling assembly 100 is devoid of hydraulics. That is, the grappling assembly 100 is operable without the use of hydraulics. Alternatively, the grappling assembly 100 can include one or more hydraulic devices, and/or operatively connect to the arm(s) 102 through hydraulics.

U.S. Pat. No. 10,815,100, entitled "Grappling Assembly for Use with Utility Equipment" discloses an example of a grappling assembly, and is hereby incorporated by reference in its entirety. The grappling assembly shown in U.S. Pat. No. 10,815,100 is merely an example, and is not limiting.

U.S. Pat. No. 10,414,633, entitled "Grappling Assembly for Use with Utility Equipment" discloses an example of a grappling assembly, and is hereby incorporated by reference in its entirety. The grappling assembly shown in U.S. Pat. No. 10,414,633 is merely an example, and is not limiting.

Figure 2:
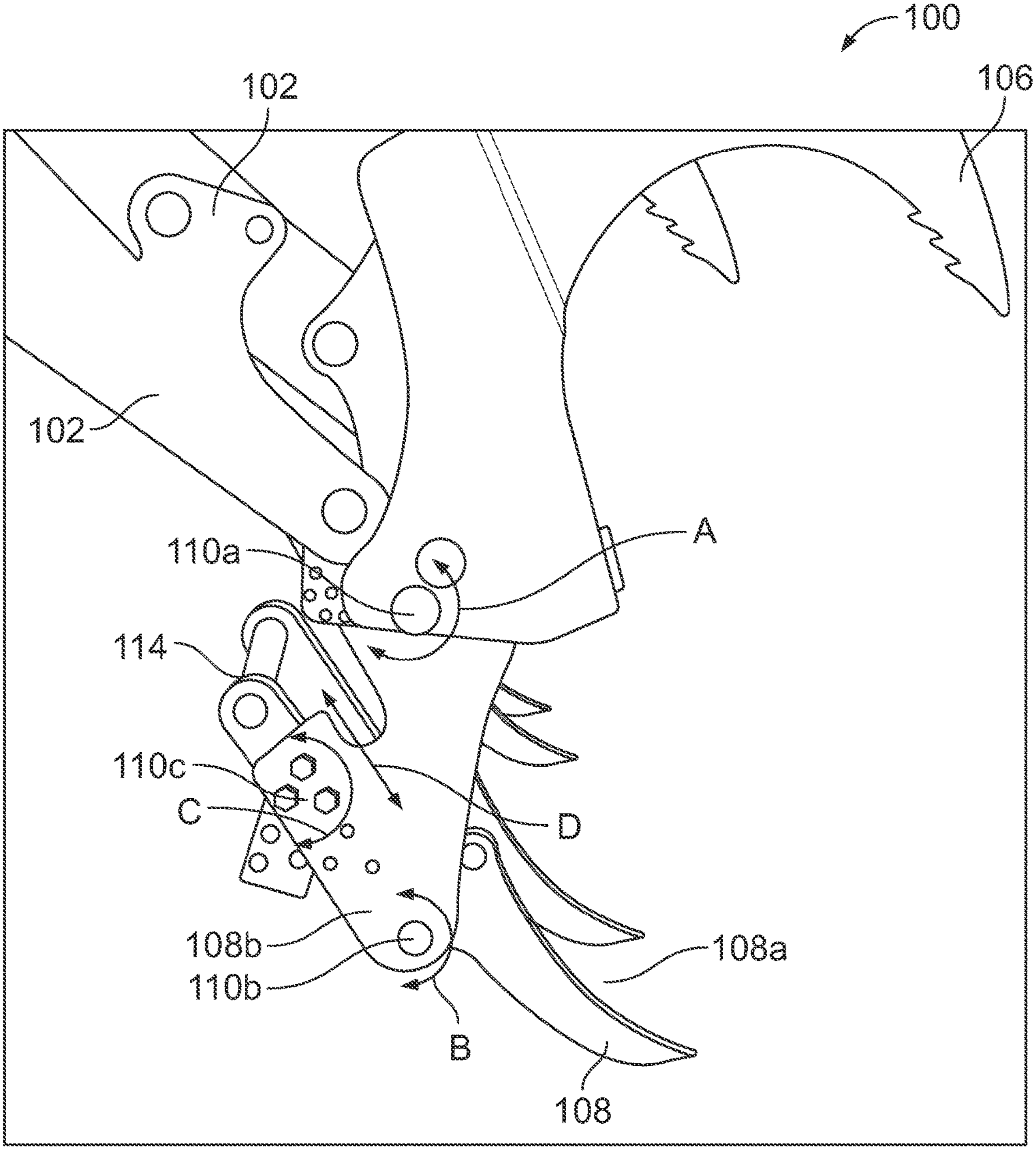
FIG. 2 illustrates a perspective side view of a grappling assembly coupled to arms, according to an example of the present disclosure.

FIG. 2 illustrates a perspective side view of a grappling assembly 100 coupled to arms 102, according to an example of the present disclosure. The grappling assembly 100 includes a first pivot coupling 110*a* configured to allow the first claw 106 pivot in relation to the second claw 108 in the directions of arc A. The second claw 108 can also include a second pivot coupling 110*b* configured to allow a first portion 108*a* to pivot in relation to a second portion 108*b* in the directions of arc B. The second claw 108 can also include a third pivot coupling 110*c* configured to allow the second portion 108*b* to pivot in relation to a stop 114 in the direction of arc C. Additionally, the stop 114 can linearly translate in relation to the second claw 108 in the directions of line D.

Referring to FIGS. 1 and 2, in at least one example, a spring 112 can be directly coupled to the first pivot coupling 110*a*, the second pivot coupling 110*b*, and/or the third pivot coupling 110*c*. For example, a first spring 112 can be directly coupled to the first pivot coupling 110*a* (such as a pivot axle), a second spring 112 can be directly coupled to the second pivot coupling 110*b*, and/or a third spring 112 can be directly coupled to the third pivot coupling 110*c*. As another example, a spring 112 can be provided as a shock absorber between the stop 114 and the second claw 108. In at least one example, the spring 112 is configured to relieve pressure in relation to the stop 114 bottoming out on another structure, such as the second claw 108. As another example, one or more springs 112 can be directly coupled to one or both of the first claw 106 and/or the second claw 108.

Figure 3:
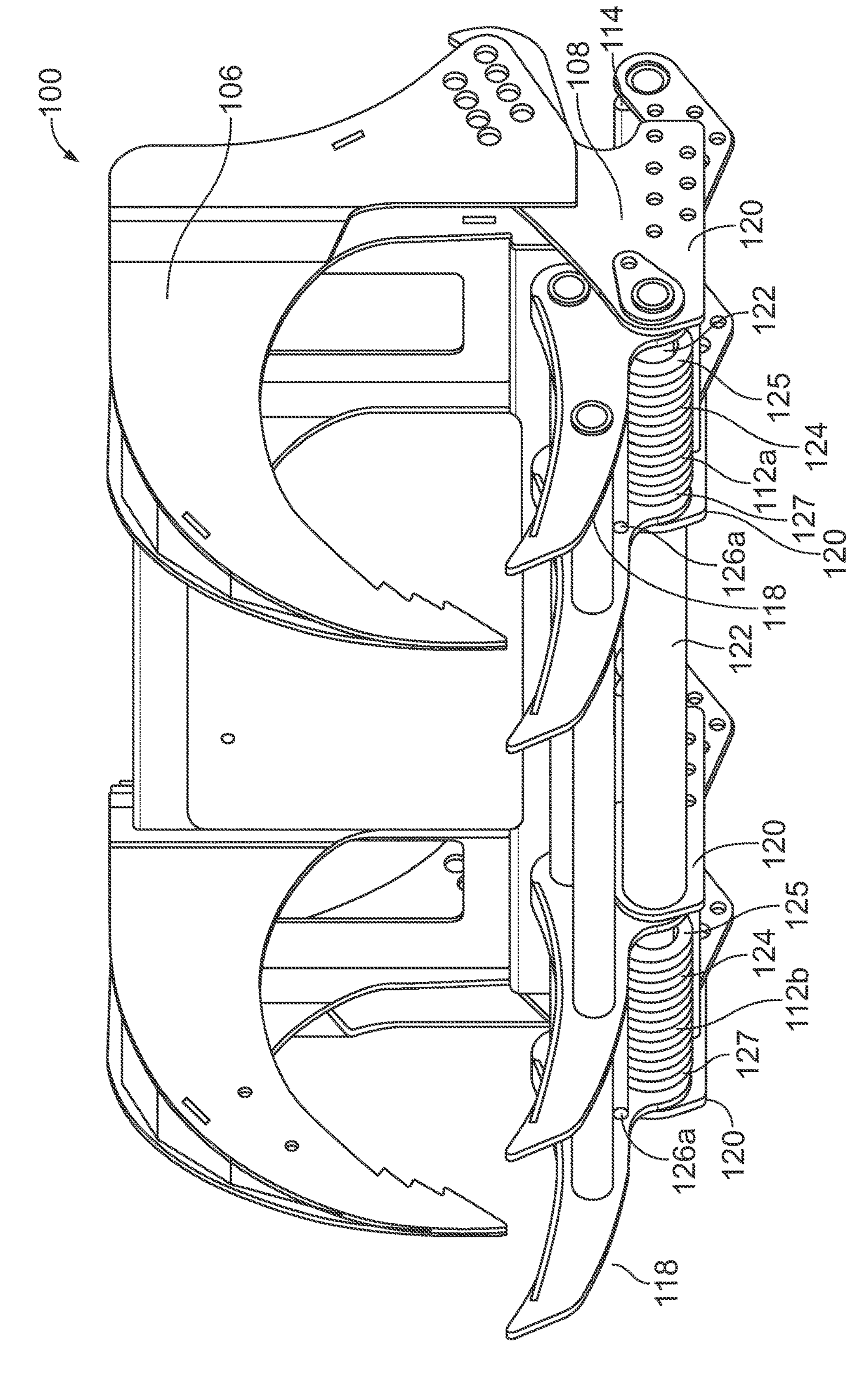
FIG. 3 illustrates an isometric front view of a grappling assembly, according to an example of the present disclosure.

FIG. 3 illustrates an isometric front view of a grappling assembly 100, according to an example of the present disclosure. As shown, the second claw 108 (and/or or the first claw 106) includes teeth 118 pivotally coupled to brackets 120 through a pivot coupling 122. The pivot coupling 122 can be an axle having a cylindrical body. A first spring 112*a* is directly coupled the pivot coupling 122 between opposed brackets 120, and a second spring 112*b* is directly coupled to the pivot coupling 122 between opposed brackets 120. Each spring 112*a* and 112*b* includes a coiled portion 124 that wraps around a portion of the pivot coupling 122 between brackets 120, and one or more linear segments 126 extending from the coiled portion 124. The first spring 112*a* and the second spring 112*b* can be torsion springs. Optionally, the grappling assembly 100 can include only one of the first spring 112*a* or the second spring 112*b*. As another example, the spring 112*a* or 112*b* can extend across substantially across an entire length of the pivot coupling 122. For example, the coiled portion 124 can extend around the pivot coupling 122 between terminal end brackets 120.

The grappling assembly 100 is in an at-rest position as shown in FIG. 3. The springs 112*a* and 112*b* exert a spring force in relation to the second claw 108 that maintains the teeth 118 in a partially-closed position in relation to the first claw 106.

Figure 4:
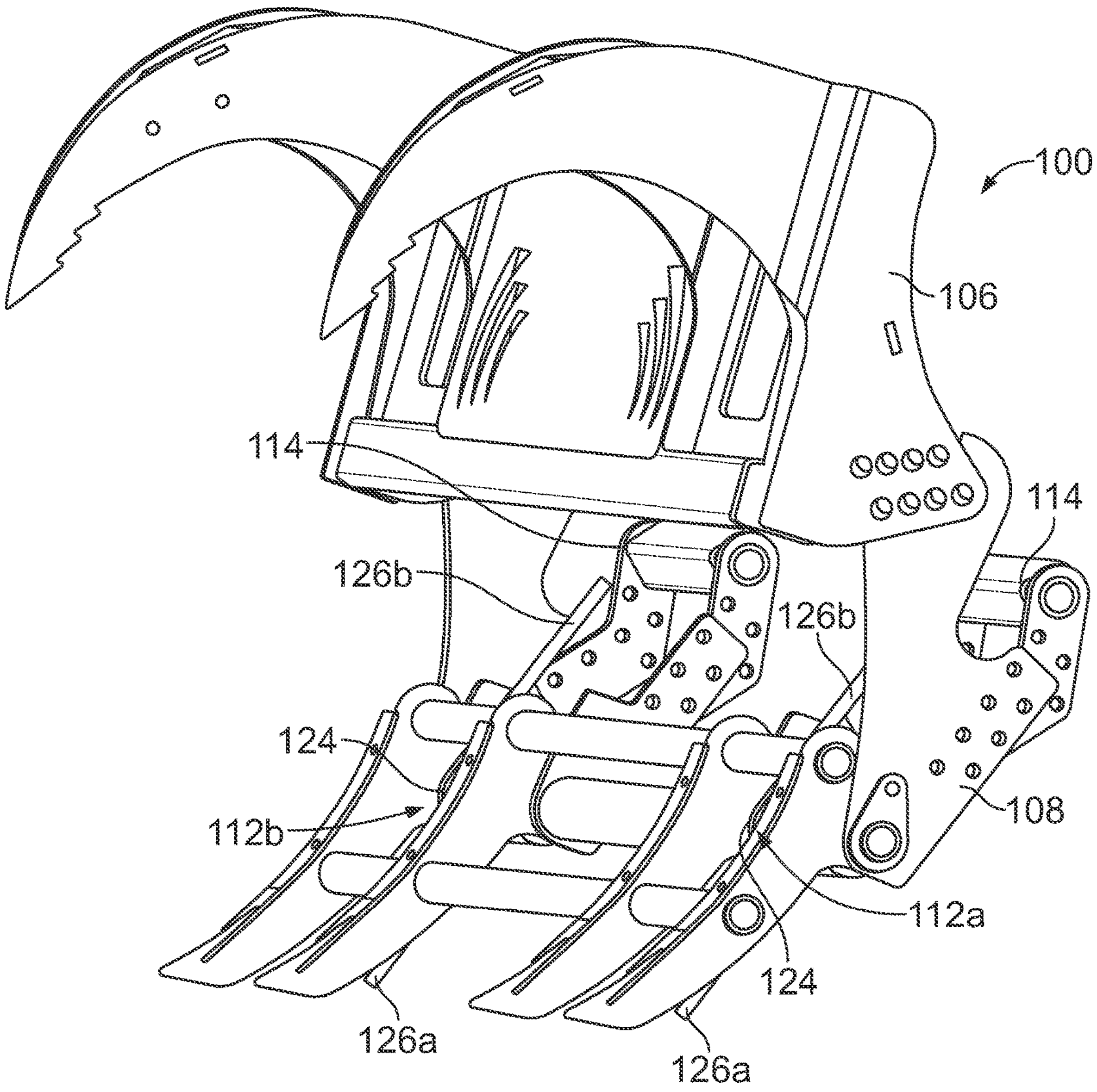
FIG. 4 illustrates an isometric front view of the grappling assembly of FIG. 3 in an open position.
Figure 5:
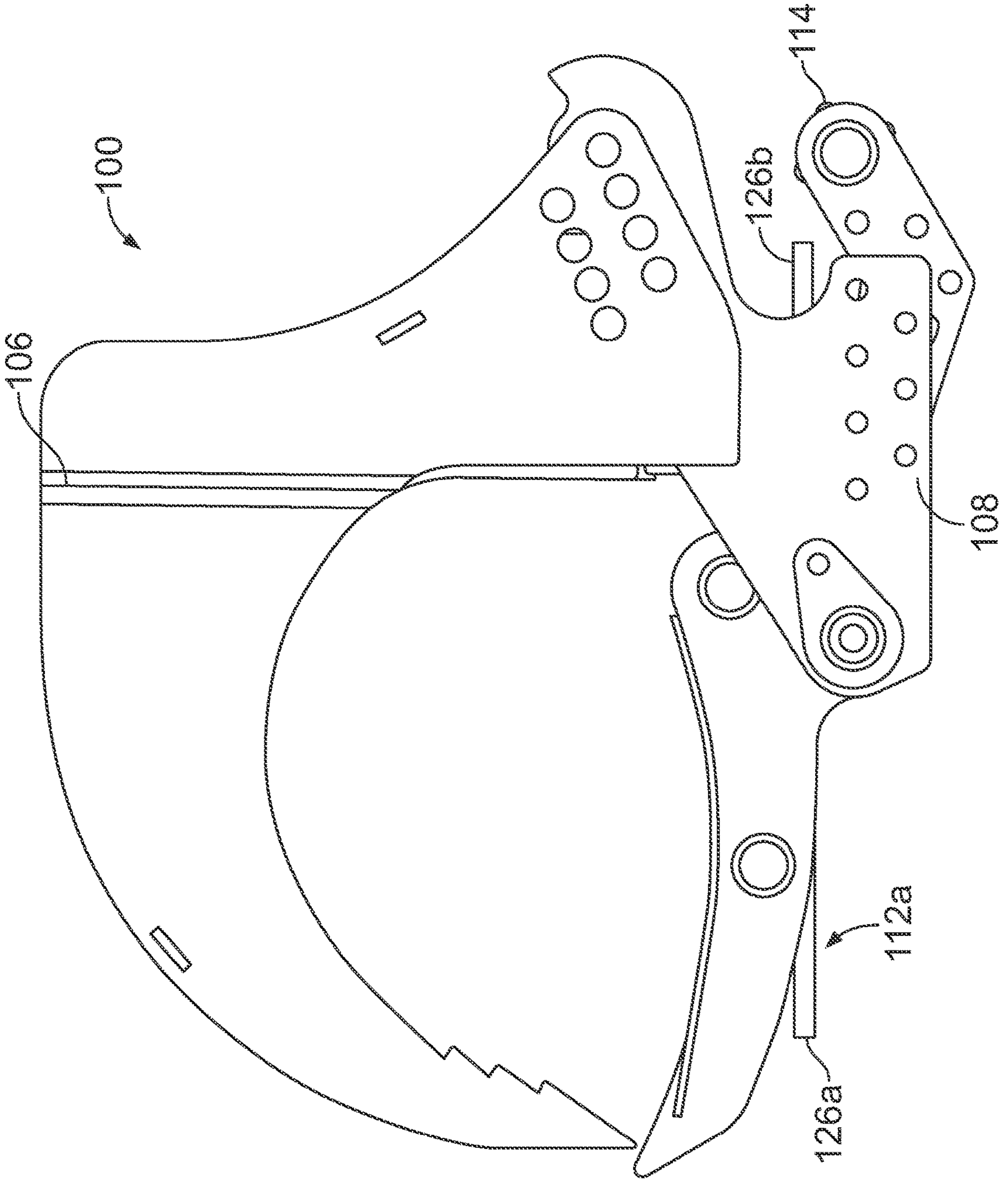
FIG. 5 illustrates a lateral view of the grappling assembly of FIG. 3 in a closed position.
Figure 6:
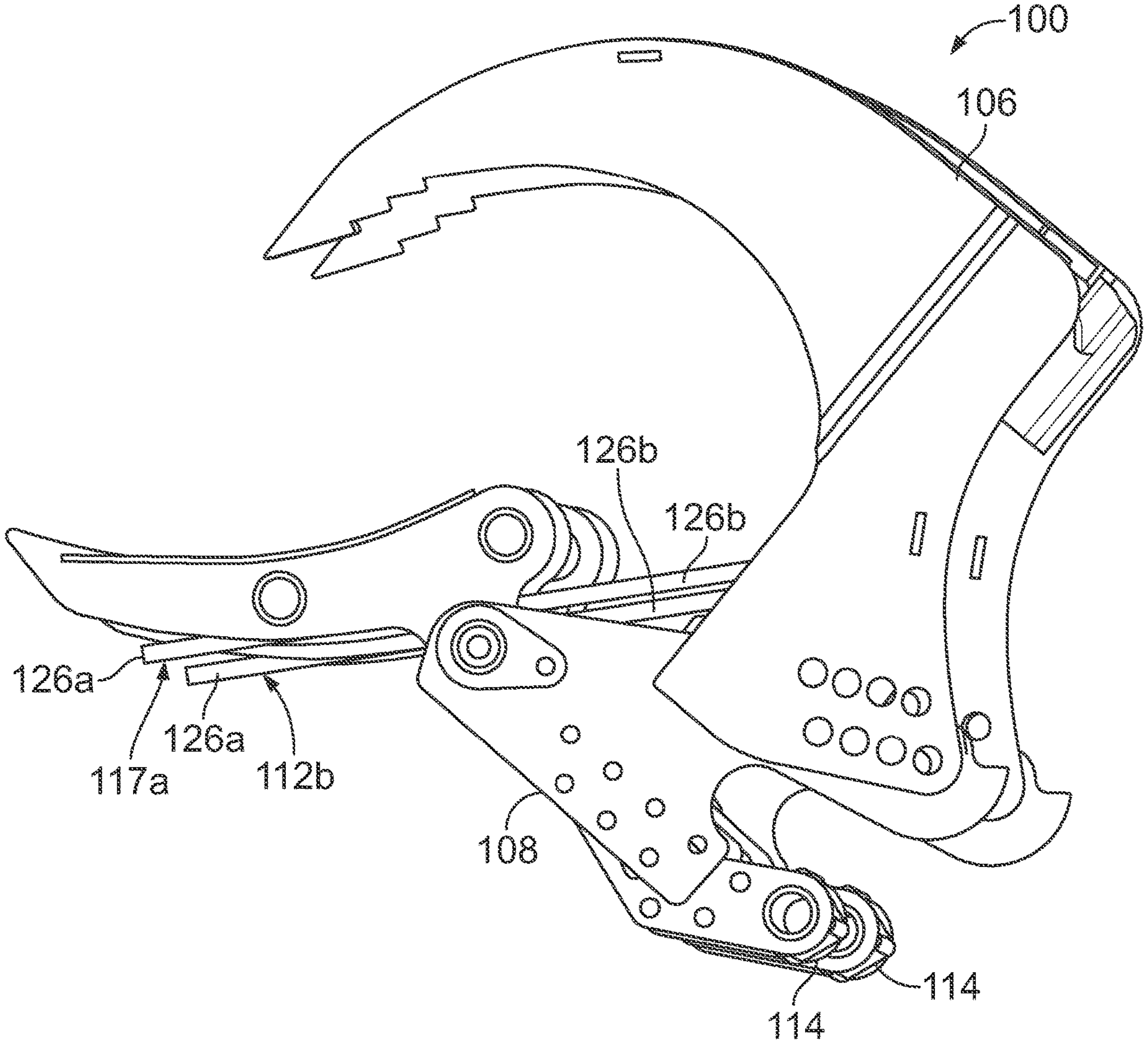
FIG. 6 illustrates an isometric rear side view of the grappling assembly of FIG. 3 in an open position.

FIG. 4 illustrates an isometric front view of the grappling assembly 100 of FIG. 3 in an open position. FIG. 5 illustrates a lateral view of the grappling assembly 100 of FIG. 3 in a closed position. FIG. 6 illustrates an isometric rear side view of the grappling assembly 100 of FIG. 3 in an open position. Referring to FIGS. 3-6, as shown, each spring 112*a* includes a first linear segment 126*a* forwardly extending from a first end 125 of the coiled portion 124, and a second linear segment 126*b* rearwardly extending from a second end 127 (opposite from the first end 125) of the coiled portion 124. The first linear segment 126*a* can be configured to abut into a surface (such as ground), and the second linear segment 126*b* can be configured to abut into a stop 114 when the grappling assembly 100 moves into the fully open position, thereby limiting an opening span of the grappling assembly 100.

As shown, the grappling assembly 100 includes springs 112*a* and 112*b* coupled to the pivot coupling 122 of the second claw 108. The first claw 106 can also include one or more springs, such as the springs 112*a* and 112*b* coupled to a pivot coupling therein, and/or which pivotally couples the first claw 106 to the second claw 108. As another example, the first claw 106 can include the springs 112*a* and 112*b*, and the second claw 108 may not include springs.

Figure 7:
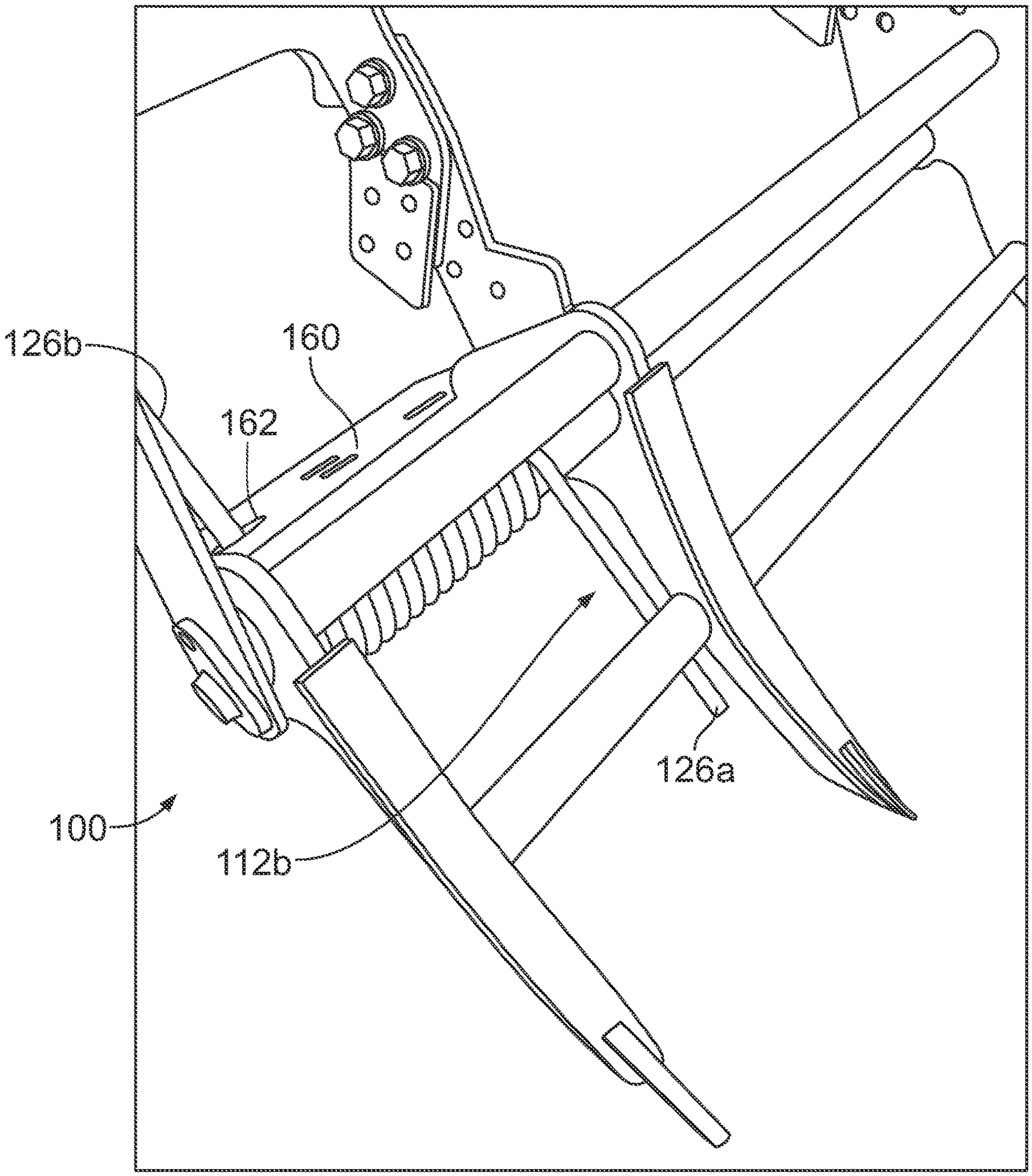
FIG. 7 illustrates a perspective front view of a claw of a grappling assembly, according to an example of the present disclosure.

FIG. 7 illustrates a perspective front view of a claw (such as the second claw 108) of a grappling assembly 100, according to an example of the present disclosure. The second claw 108 can include a wall 160 having a hole 162 through which the second linear segment 126*b* is retained, and passes through. The first segment 126*a* can similarly be retained and pass through a parallel wall. Optionally, the claw may not include walls that retain portions of a spring.

Figure 8:
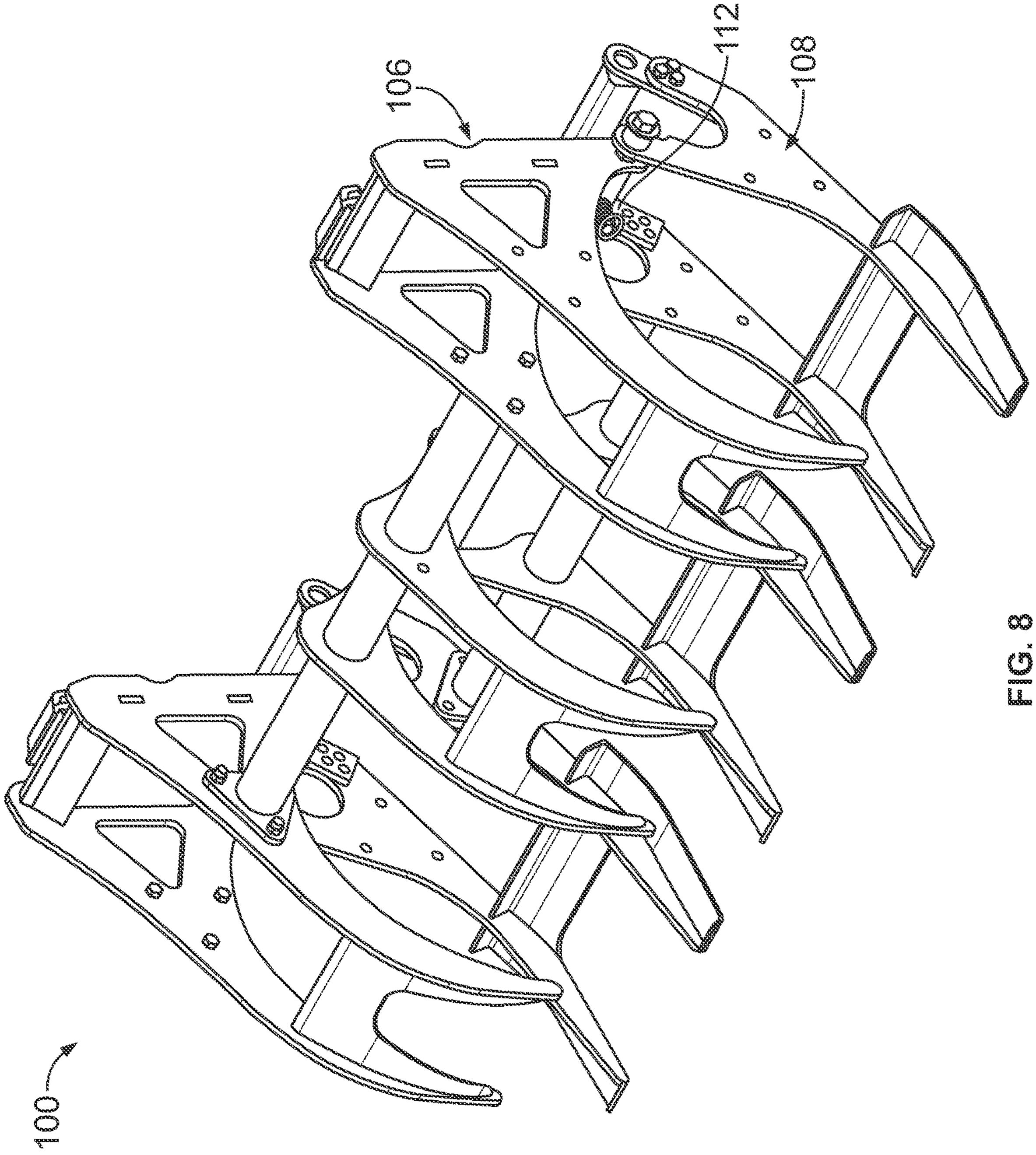
FIG. 8 illustrates an isometric top front view of a grappling assembly, according to an example of the present disclosure.
Figure 9:
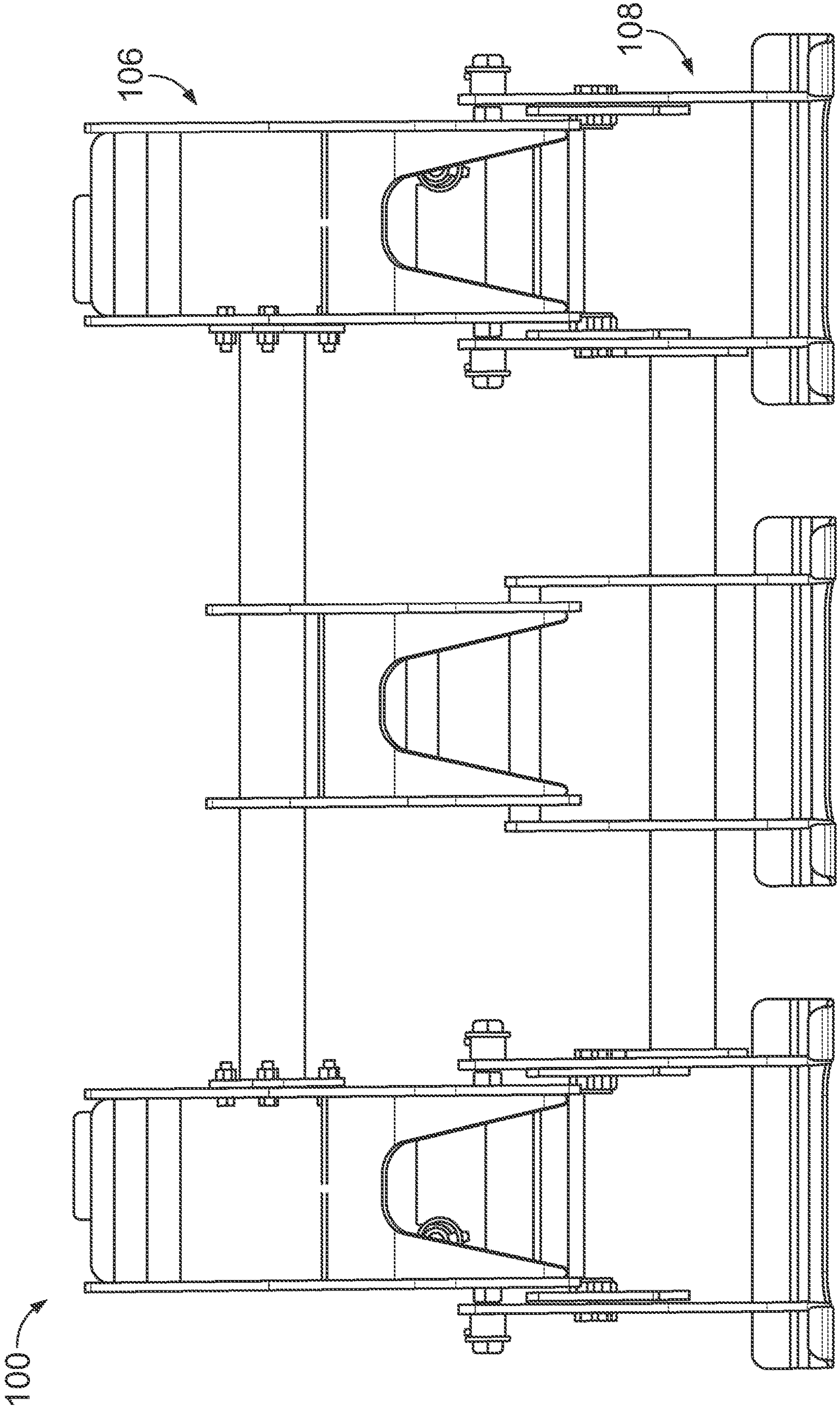
FIG. 9 illustrates a front view of the grappling assembly of FIG. 8.
Figure 10:
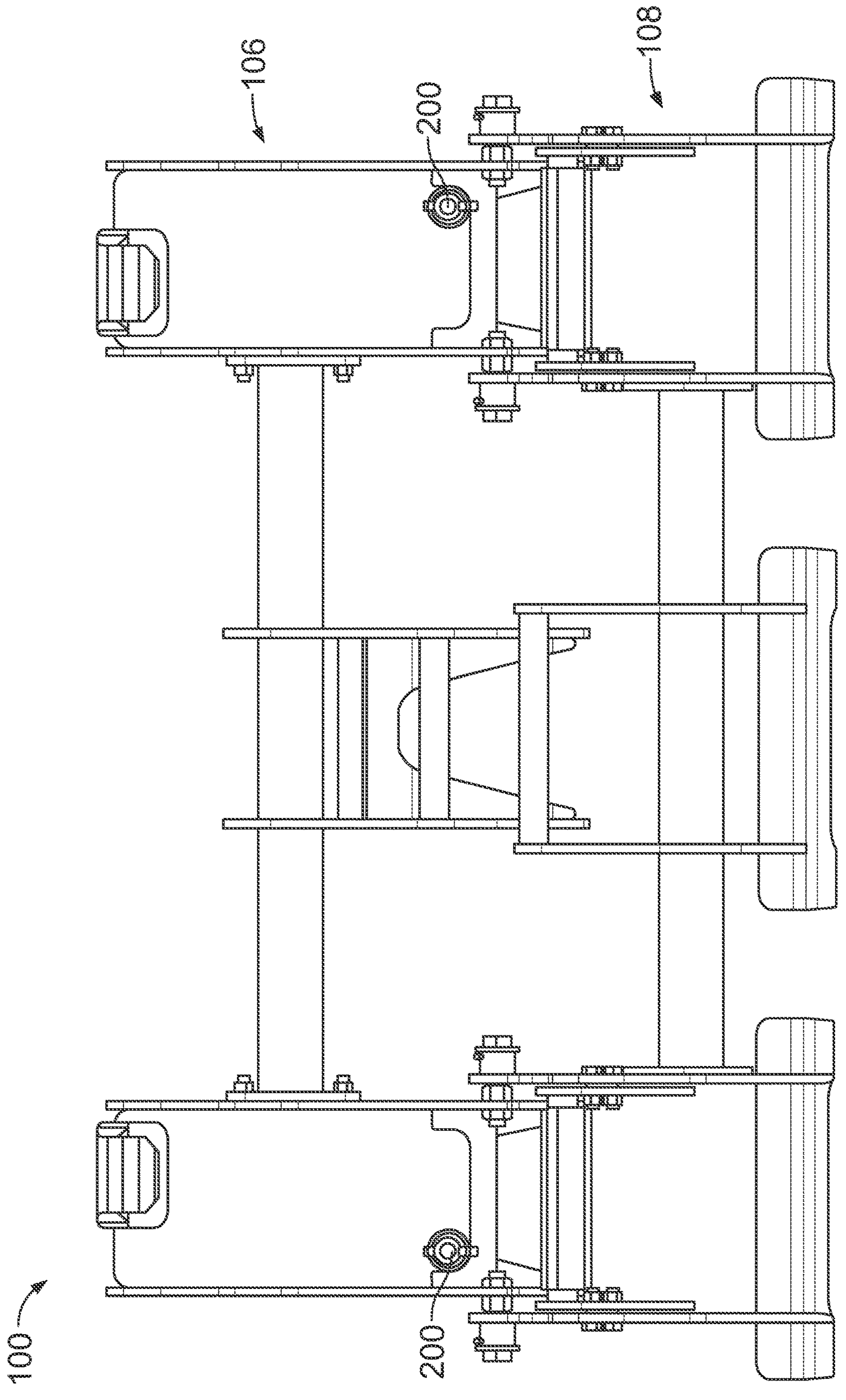
FIG. 10 illustrates a rear view of the grappling assembly of FIG. 8.
Figure 11:
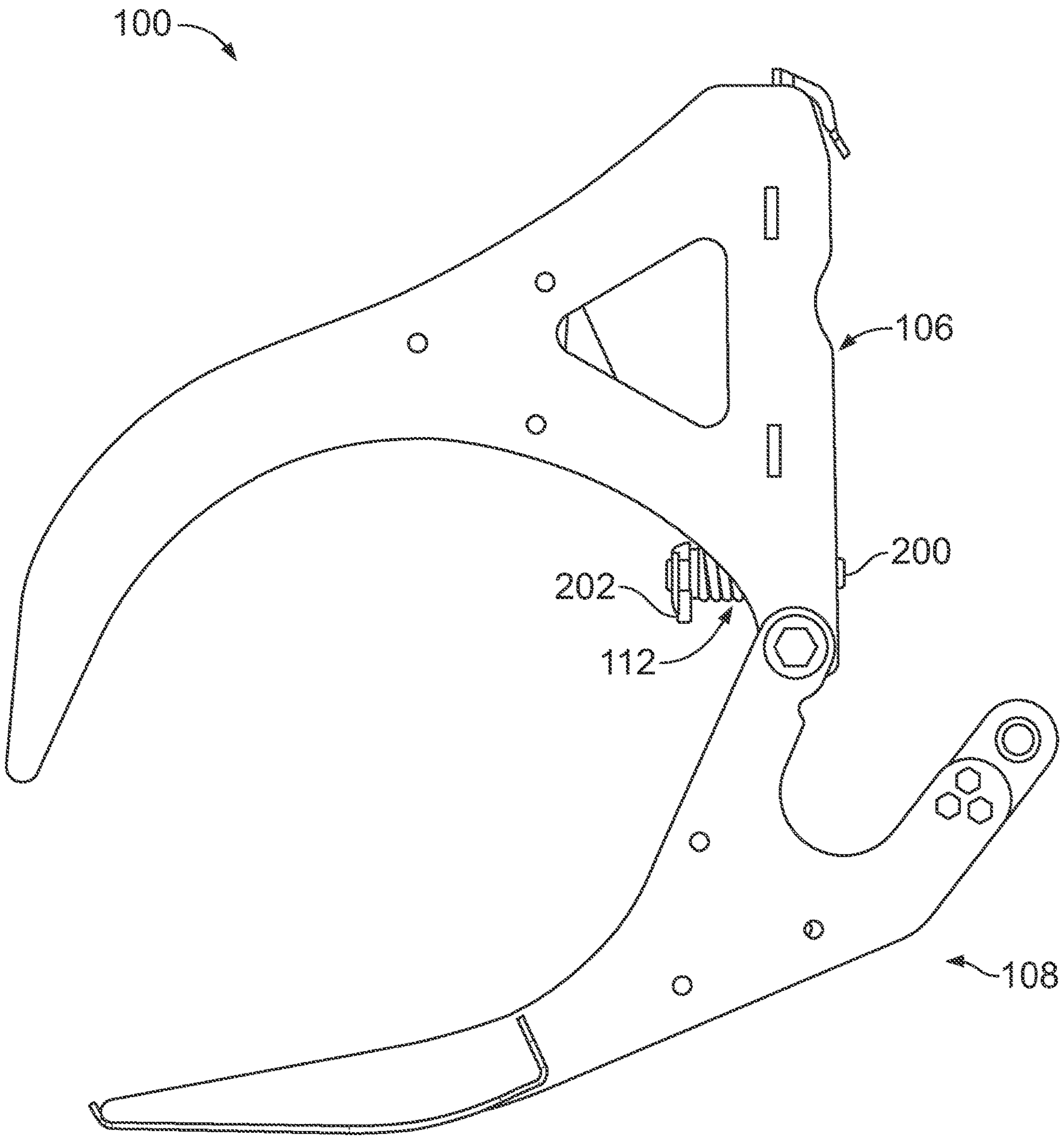
FIG. 11 illustrates a lateral view of the grappling assembly of FIG. 8.

FIG. 8 illustrates an isometric top front view of a grappling assembly 100, according to an example of the present disclosure. FIG. 9 illustrates a front view of the grappling assembly 100 of FIG. 8. FIG. 10 illustrates a rear view of the grappling assembly 100 of FIG. 8. FIG. 11 illustrates a lateral view of the grappling assembly 100 of FIG. 8. Referring to FIGS. 8-11, in at least one example, the grappling assembly 100 includes a first claw 106 (having teeth) and a second claw 108 (having teeth). One or more springs 112 are operatively coupled to the first claw 106 and the second claw 108.

Figure 12:
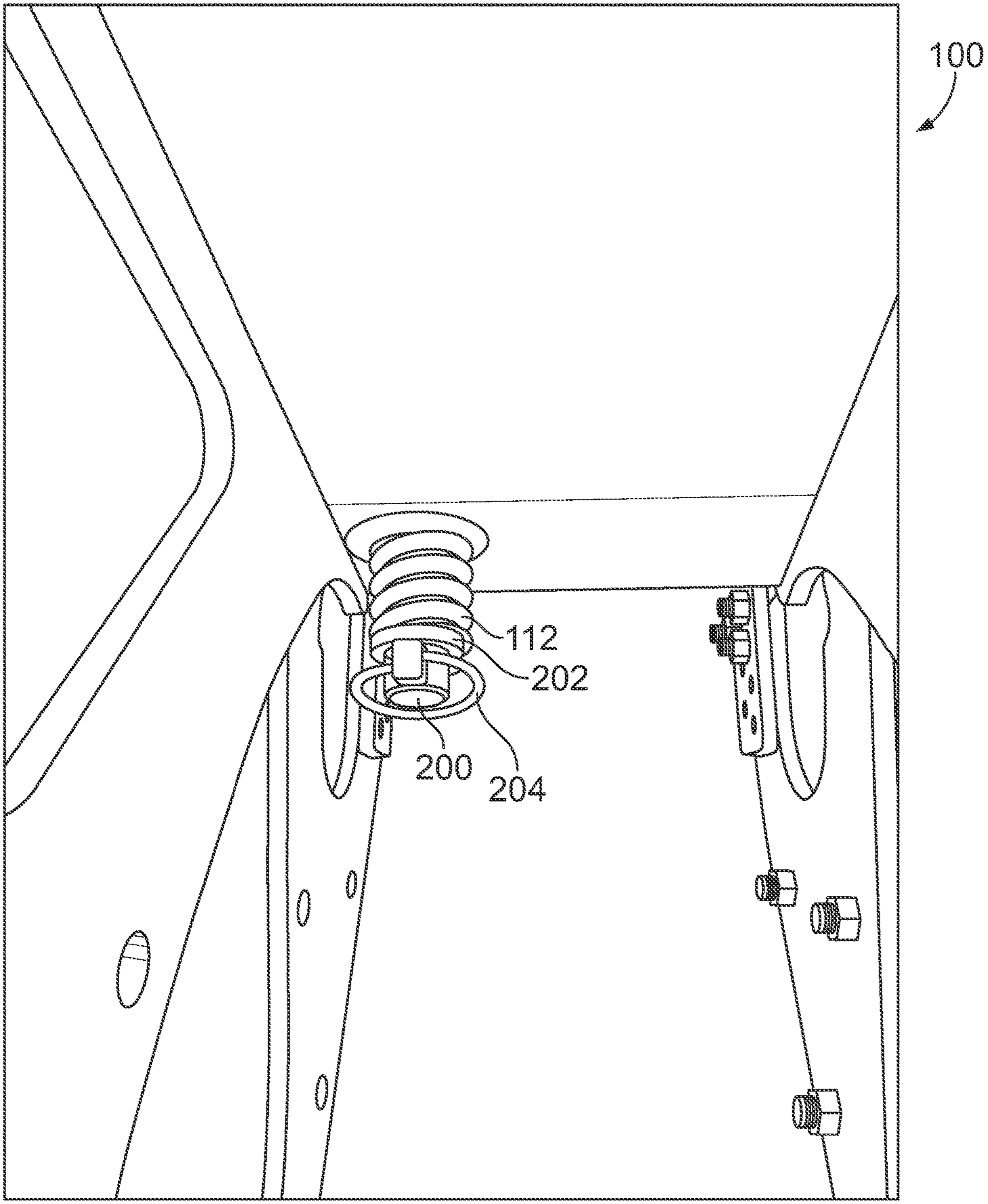
FIG. 12 illustrates a perspective view of a spring coupled to a grappling assembly, according to an example of the present disclosure.
Figure 13:
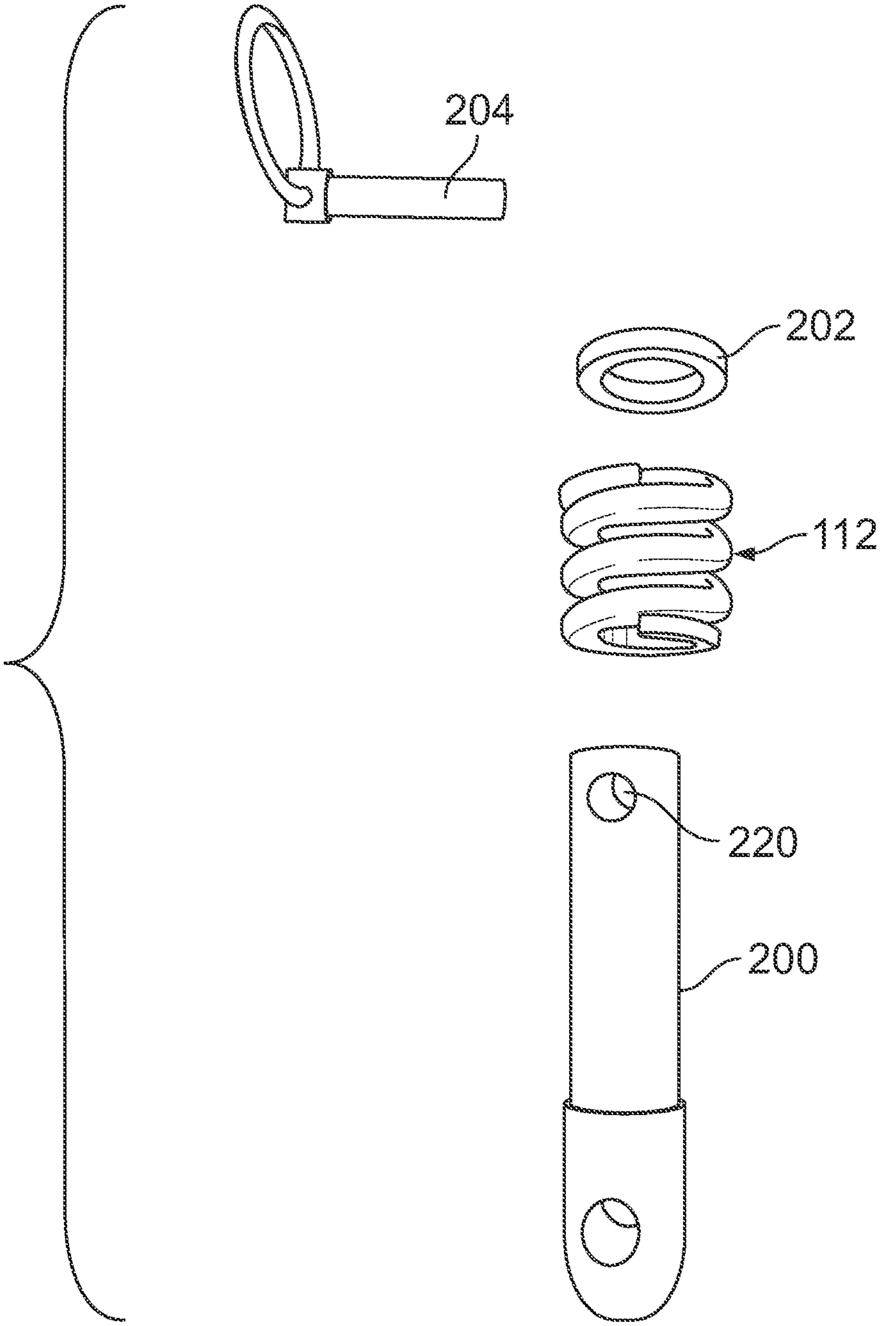
FIG. 13 illustrates a perspective view of the spring disconnected from a rod, according to an example of the present disclosure.
Figure 14:
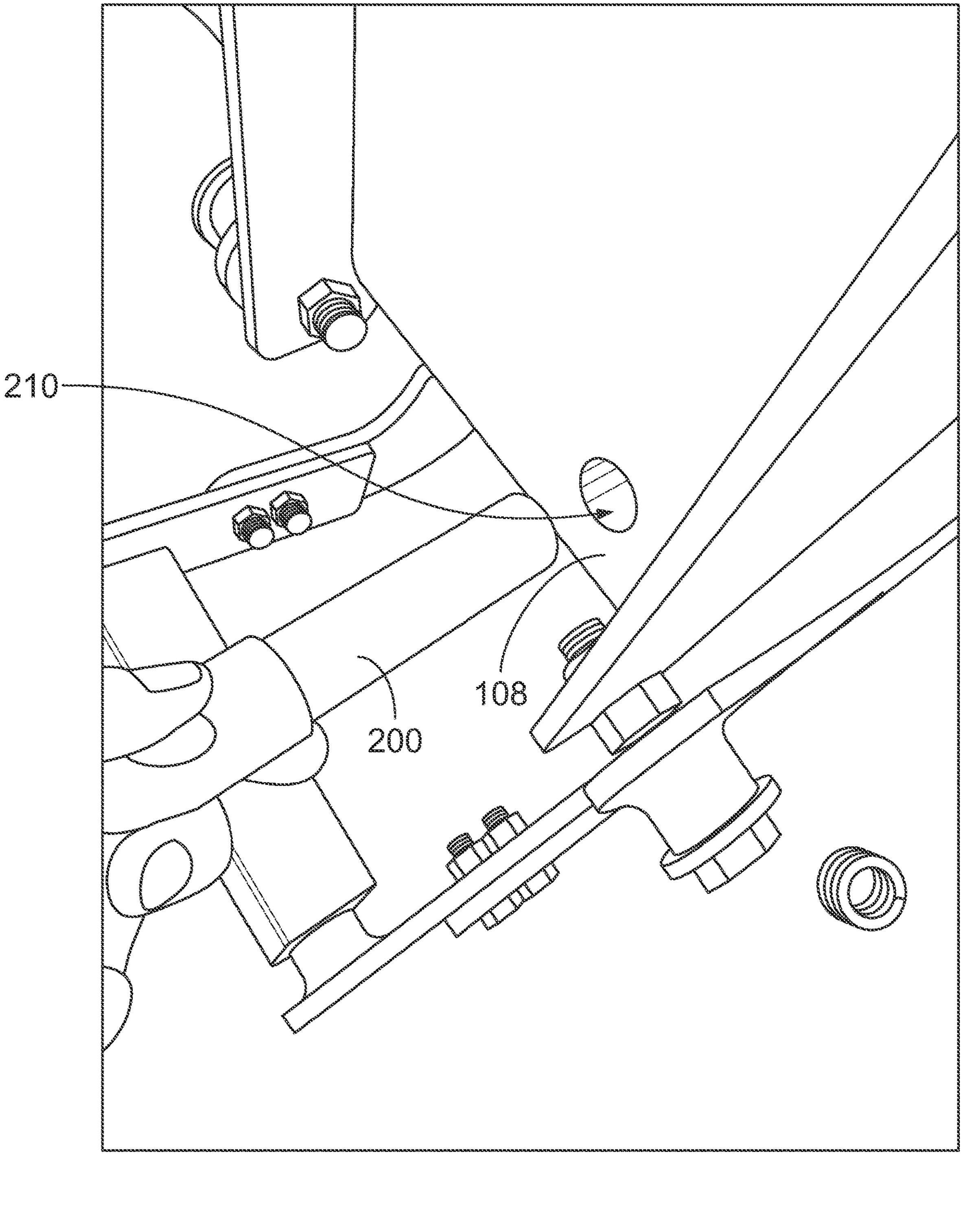
FIG. 14 illustrates a perspective view of the rod disconnected from the grappling assembly, according to an example of the present disclosure.
Figure 16:
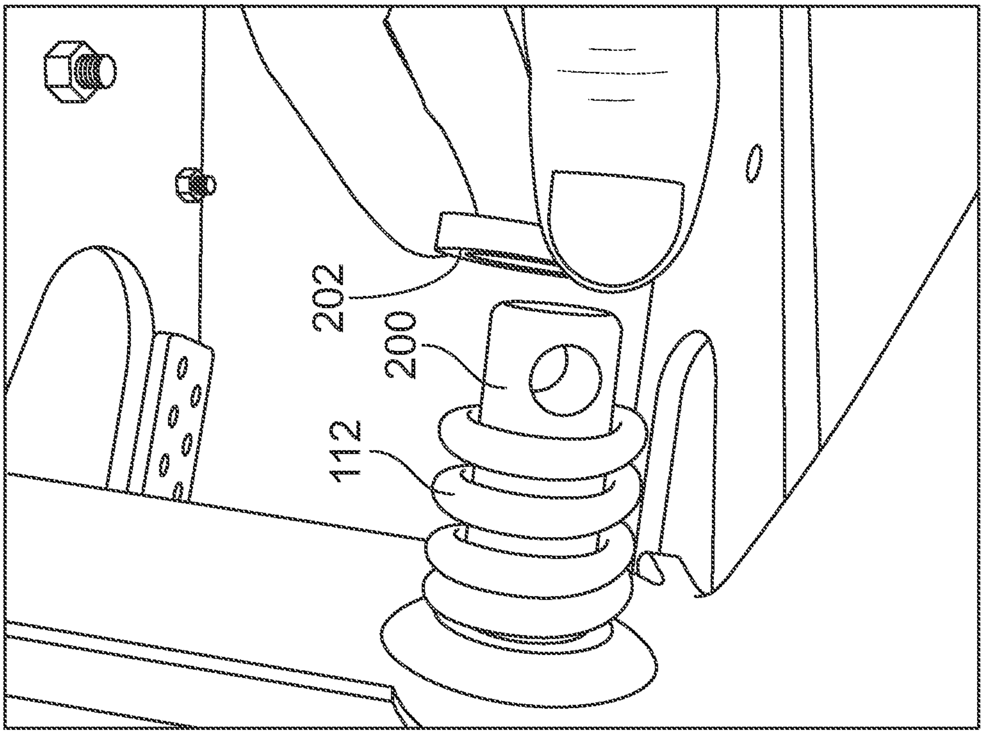
FIG. 16 illustrates a perspective view of a cap being aligned with the spring and rod, according to an example of the present disclosure.
Figure 15:
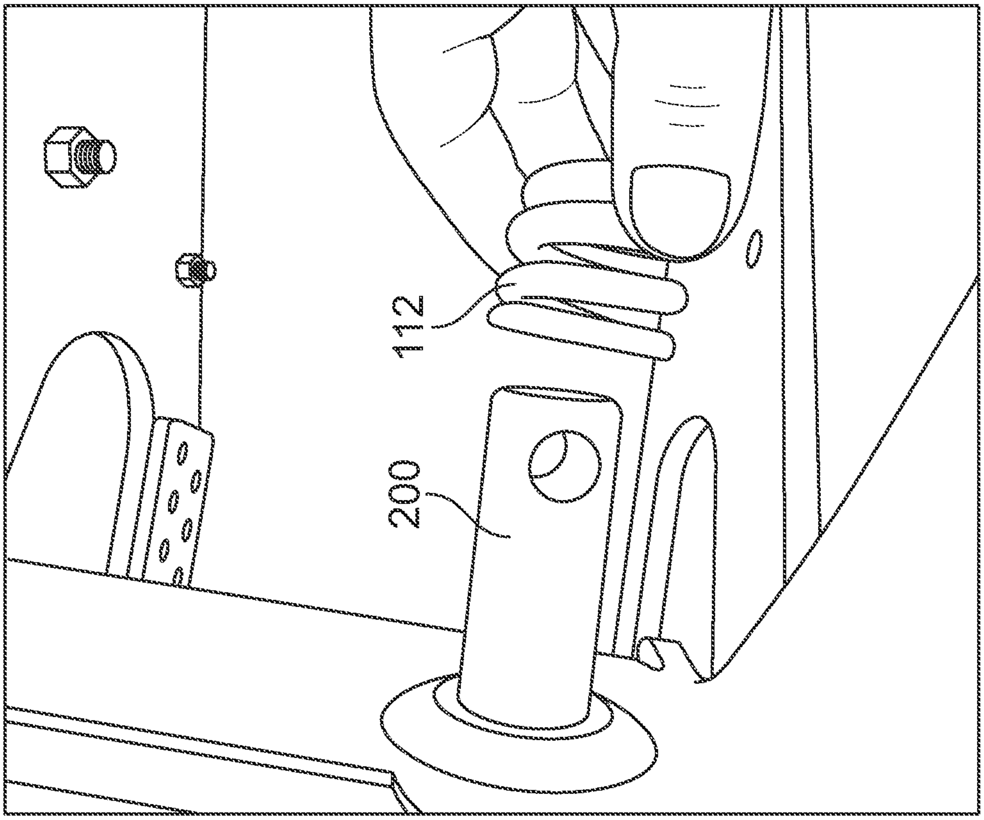
FIG. 15 illustrates a perspective view of the spring being aligned with the rod, according to an example of the present disclosure.
Figure 18:
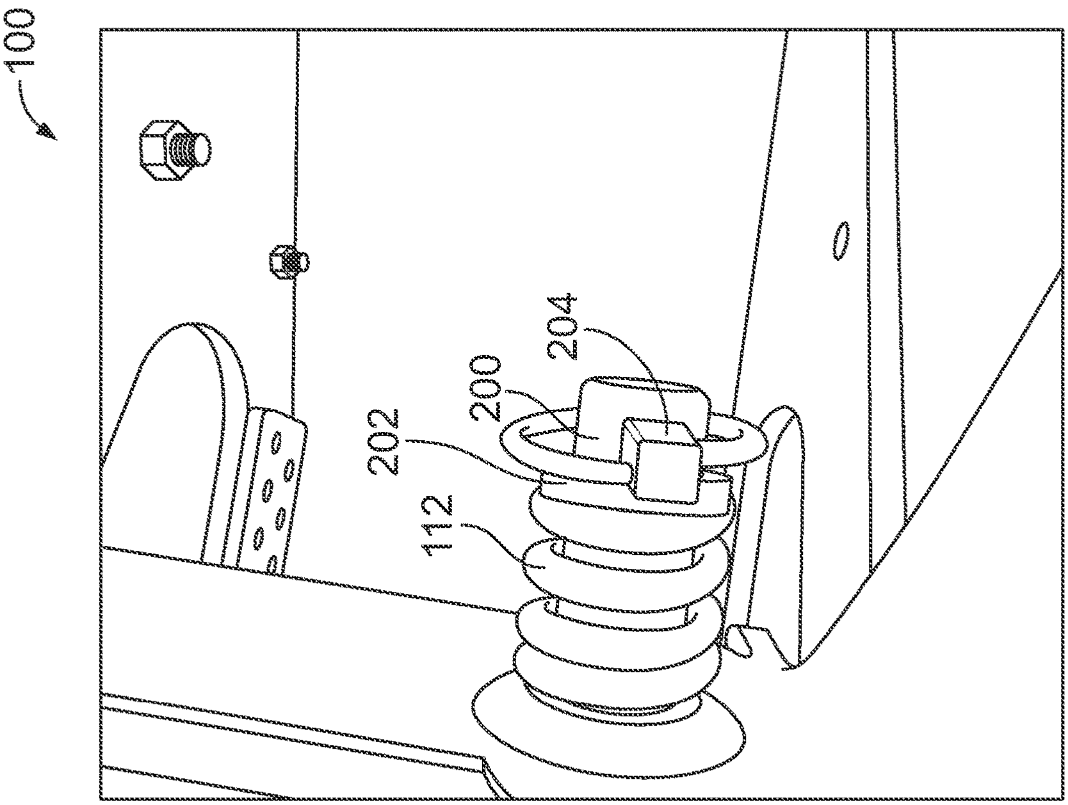
FIG. 18 illustrates a perspective view of the spring secured to the grappling assembly, according to an example of the present disclosure.
Figure 17:
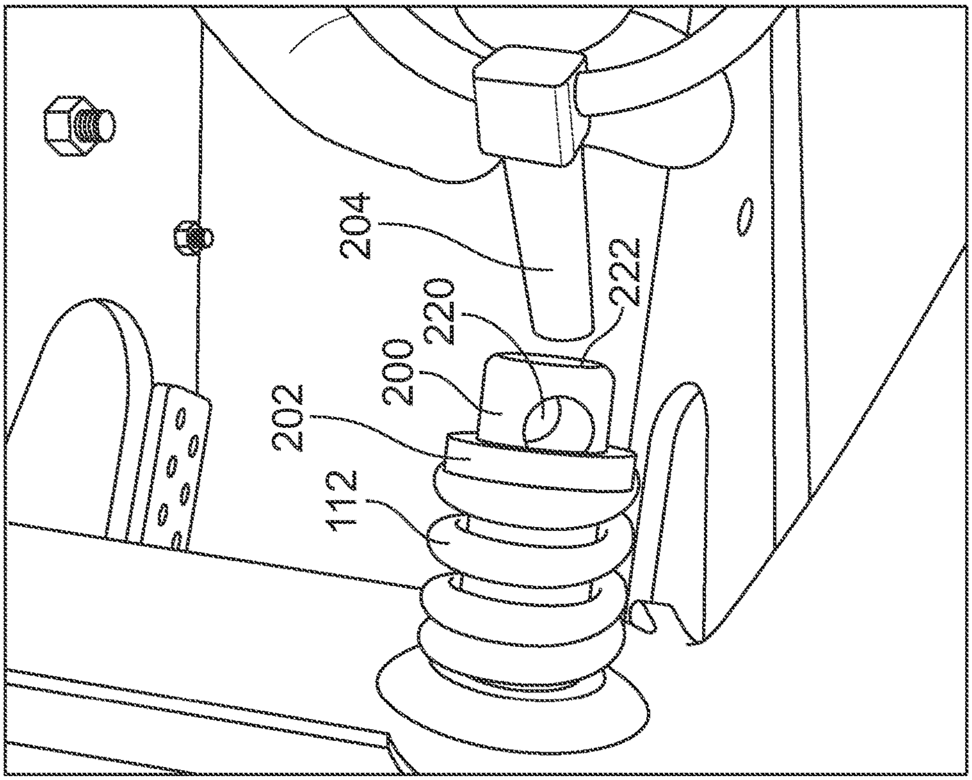
FIG. 17 illustrates a perspective view of a pin disconnected from the rod, according to an example of the present disclosure.

FIG. 12 illustrates a perspective view of a spring 112 coupled to the grappling assembly 100, according to an example of the present disclosure. FIG. 13 illustrates a perspective view of the spring 112 disconnected from a rod 200. FIG. 14 illustrates a perspective view of the rod 200 disconnected from the grappling assembly 100. FIG. 15 illustrates a perspective view of the spring 112 being aligned with the rod 200. FIG. 16 illustrates a perspective view of a cap 202 being aligned with the spring 112 and the rod 200. FIG. 17 illustrates a perspective view of a pin 204 disconnected from the rod 200. FIG. 18 illustrates a perspective view of the spring 112 secured to the grappling assembly 100.

Referring to FIGS. 8-18, in an example, a rod 200 is inserted into a hole 210 of one or both of the first claw 106 and/or the second claw 108. The spring 112 fits around a portion of the rod 200. For example, the spring 112 coils around a portion of a cylindrical body of the rod 200. The cap 202 fits around the rod 200, over the spring 112, exposing a channel 220 extending through an end 222 of the rod 200. The pin 204 can then be used to secure the spring 112 in position around the portion of the rod 200. For example, the pin 204 is inserted into the channel 220, and retained therein, thereby securing the spring 112 and the cap 202 in place around the rod 200.

Optionally, the spring 112 can be secured to the first claw 106 and/or the second claw 108 in various other ways. For example, the spring 112 can be integrally formed with a portion of the first claw 106 or the second claw 108. As another example, the spring 112 can be fastened to a surface of the first claw 106 and/or the second claw 108.

In at least one example, the spring 112 is coupled to the first claw 106 and/or the second claw 108 via the rod 200, the cap 202, and the pin 204. Optionally, the first claw 106 and the second claw 108 can be sized and shaped differently than shown. The first claw 106 and the second claw 108 can include greater or fewer prongs, teeth, protuberances, and/or the like than shown.

During operation of the grappling assembly 100, as the first claw 106 and the second claw 108 pivot or otherwise rotate relative to one another, the spring(s) 112 exerts a resistive force into second claw 108 (and/or the first claw 106). The spring(s) 112 and the rod 200 relieve pressure that is caused when clamping force is exerted by the first claw 106 and the second claw 106. In at least one example, the grappling assembly 100 pushes against a loader and exerts a force on the rod 200. The spring 112 relieves force that may otherwise cause the rod 200 to deform, or break. In at least one example, the spring 112 can be disposed in relation to a back surface of the first claw 106 to relieve pressure. The spring 112 in one or more of the positions shown and/or at other locations is configured to relieve pressure.

The rod 200 provides a quick connect attachment for the spring 112. Optionally, the rod 200 can be shaped and configured differently than shown.

The spring 112 is coupled to one or both of the first claw 106 and/or the second claw 108 to relieve pressure. For example, the spring 112 is configured to provide relief of pressure exerted on a quick hitch stationary connection.

In at least one example of the present disclosure, the grappling assembly 100 includes the first claw 106, the second claw 108, the rod 200 coupled to one or both of the first claw 106 and/or the second claw 108, and one or more springs 112 coupled to a portion of the rod 200. In at least one example, the cap 202 is secured to the rod 200 over the spring 112, thereby constraining the spring 112 between a portion of the first claw 106 and/or the second claw 108, and the cap 202. In at least one example, the pin 204 is removably secured to the rod 200.

Further, the disclosure comprises examples according to the following clauses:

Clause 1. A grappling assembly configured to connect to one or more arms of a utility component, wherein the grappling assembly comprises:

a first claw;

a second claw;

one or more pivot couplings; and one or more springs coupled to one or more of the first claw, the second claw, or the one or more pivot couplings.

Clause 2. The grappling assembly of Clause 1, wherein the one or more pivot couplings pivotally couple the first claw to the second claw, and wherein the one or more springs are coupled to the one or more pivot couplings.

Clause 3. The grappling assembly of Clause 1, wherein the one or more pivot couplings pivotally couple a first portion of the first claw to a second portion of the first claw, and wherein the one or more springs are coupled to the one or more pivot couplings.

Clause 4. The grappling assembly of Clause 1, wherein the one or more pivot couplings pivotally couple a first portion of the second claw to a second portion of the second claw, and wherein the one or more springs are coupled to the one or more pivot couplings.

Clause 5. The grappling assembly of Clause 1, wherein the one or more springs comprise a first spring, a second spring, and a third spring, and wherein the one or more pivot couplings comprise:

a first pivot coupling that pivotally couples the first claw to the second claw, wherein the first spring directly couples to the first pivot coupling;

a second pivot coupling that pivotally couples a first portion of the first claw to a second portion of the first claw, wherein the second spring directly couples to the second pivot coupling; and a third pivot coupling that couples a first portion of the second claw to a second portion of the second claw, wherein the third spring directly couples to the third pivot coupling.

Clause 6. The grappling assembly of any of Clauses 1-5, wherein the grappling assembly is devoid of hydraulics.

Clause 7. The grappling assembly of any of Clauses 1-6, wherein the one or more springs comprise:

a coiled portion wrapped around a portion of the one or more pivot couplings;

a first linear segment forwardly extending from a first end of the coiled portion; and a second linear segment rearwardly extending from a second end of the coiled portion, wherein the first end is opposite from the second end.

Clause 8. The grappling assembly of Clause 7, wherein the one or more springs comprise a first spring and a second spring.

Clause 9. The grappling assembly of any of Clauses 1-8, further comprising one or more rods coupled to one or both of the first claw or the second claw, wherein the one or more springs are coupled to one or more portions of the one or more rods.

Clause 10. The grappling assembly of Clause 9, further comprising one or more caps secured to the one or more rods over the one or more springs.

Clause 11. The grappling assembly of Clause 10, further comprising one or more pins removably secured to the one or more rods.

Clause 12. A method for a grappling assembly configured to connect to one or more arms of a utility component, the method comprising:

coupling one or more springs to one or more of a first claw, a second claw, or one or more pivot couplings of the grappling assembly.

Clause 13. The method of Clause 12, wherein said coupling comprises coupling the one or more springs to the one or more pivot couplings that pivotally couple the first claw to the second claw.

Clause 14. The method of Clauses 12 or 13, wherein said coupling comprises coupling the one or more springs to the one or more pivot couplings that pivotally couple a first portion of the first claw to a second portion of the first claw.

Clause 15. The method of any of Clauses 12-14, wherein said coupling comprises coupling the one or more springs to the one or more pivot couplings that pivotally couple a first portion of the second claw to a second portion of the second claw.

Clause 16. The method of any of Clauses 12-15, wherein the grappling assembly is devoid of hydraulics.

Clause 17. The method of any of Clauses 12-16, wherein the one or more springs comprise:

a coiled portion wrapped around a portion of the one or more pivot couplings;

a first linear segment forwardly extending from a first end of the coiled portion; and a second linear segment rearwardly extending from a second end of the coiled portion, wherein the first end is opposite from the second end.

Clause 18. The method of Clause 17, wherein the one or more springs comprise a first spring and a second spring.

Clause 19. The method of any of Clauses 12-18, wherein the grappling assembly comprises:

one or more rods coupled to one or both of the first claw or the second claw, wherein the one or more springs are coupled to one or more portions of the one or more rods;

one or more caps secured to the one or more rods over the one or more springs; and one or more pins removably secured to the one or more rods.

Clause 20. A grappling assembly configured to connect to one or more arms of a utility component, wherein the grappling assembly comprises:

a first claw;

a second claw;

a pivot coupling; and a first spring and a second spring coupled to the pivot coupling, wherein each of the first spring and the second spring comprises:

a coiled portion wrapped around a portion of the pivot coupling;

a first linear segment forwardly extending from a first end of the coiled portion; and a second linear segment rearwardly extending from a second end of the coiled portion, wherein the first end is opposite from the second end.

As described herein, examples of the present disclosure provide efficient and effective grappling assemblies that can be quickly and easily coupled to one or more arms of a utility component. Further, examples of the present disclosure provide grappling assemblies configured to resiliently grasp various structures.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A grappling assembly devoid of hydraulics, and configured to connect to one or more arms of a utility component, wherein the grappling assembly comprises:

a first claw;

a second claw;

one or more pivot couplings; and one or more springs coupled to one or more of the first claw, the second claw, or the one or more pivot couplings, wherein the one or more springs comprise a coiled portion wrapped around a portion of the one or more pivot couplings.

2. The grappling assembly of claim 1, wherein the one or more pivot couplings pivotally couple the first claw to the second claw, and wherein the one or more springs are coupled to the one or more pivot couplings.

3. The grappling assembly of claim 1, wherein the one or more pivot couplings pivotally couple a first portion of the first claw to a second portion of the first claw, and wherein the one or more springs are coupled to the one or more pivot couplings.

4. The grappling assembly of claim 1, wherein the one or more pivot couplings pivotally couple a first portion of the second claw to a second portion of the second claw, and wherein the one or more springs are coupled to the one or more pivot couplings.

5. The grappling assembly of claim 1, wherein the one or more springs comprise a first spring, a second spring, and a third spring, wherein one or more of the first spring, the second spring, or the third spring comprises the coiled portion, and wherein the one or more pivot couplings comprise:

a first pivot coupling that pivotally couples the first claw to the second claw, wherein the first spring directly couples to the first pivot coupling;

a second pivot coupling that pivotally couples a first portion of the first claw to a second portion of the first claw, wherein the second spring directly couples to the second pivot coupling; and a third pivot coupling that couples a first portion of the second claw to a second portion of the second claw, wherein the third spring directly couples to the third pivot coupling.

6. The grappling assembly of claim 1, wherein the one or more springs further comprise:

a first linear segment forwardly extending from a first end of the coiled portion; and a second linear segment rearwardly extending from a second end of the coiled portion, wherein the first end is opposite from the second end.

7. The grappling assembly of claim 6, wherein the one or more springs comprise a first spring and a second spring, wherein one or both of the first spring or the second spring comprises the coiled portion.

8. The grappling assembly of claim 1, further comprising one or more rods coupled to one or both of the first claw or the second claw, wherein the one or more springs are coupled to one or more portions of the one or more rods.

9. The grappling assembly of claim 8, further comprising one or more caps secured to the one or more rods over the one or more springs.

10. The grappling assembly of claim 9, further comprising one or more pins removably secured to the one or more rods.

11. A method for a grappling assembly devoid of hydraulics, and configured to connect to one or more arms of a utility component, the method comprising:

coupling one or more springs to one or more of a first claw, a second claw, or one or more pivot couplings of the grappling assembly, wherein the one or more springs comprise a coiled portion wrapped around a portion of the one or more pivot couplings.

12. The method of claim 11, wherein said coupling comprises coupling the one or more springs to the one or more pivot couplings that pivotally couple the first claw to the second claw.

13. The method of claim 11, wherein said coupling comprises coupling the one or more springs to the one or more pivot couplings that pivotally couple a first portion of the first claw to a second portion of the first claw.

14. The method of claim 11, wherein said coupling comprises coupling the one or more springs to the one or more pivot couplings that pivotally couple a first portion of the second claw to a second portion of the second claw.

15. The method of claim 11, wherein the one or more springs further comprise:

a first linear segment forwardly extending from a first end of the coiled portion; and a second linear segment rearwardly extending from a second end of the coiled portion, wherein the first end is opposite from the second end.

16. The method of claim 15, wherein the one or more springs comprise a first spring and a second spring, and wherein one or both of the first spring or the second spring comprises the coiled portion.

17. The method of claim 11, wherein the grappling assembly comprises:

one or more rods coupled to one or both of the first claw or the second claw, wherein the one or more springs are coupled to one or more portions of the one or more rods;

one or more caps secured to the one or more rods over the one or more springs; and one or more pins removably secured to the one or more rods.

18. A grappling assembly configured to connect to one or more arms of a utility component, wherein the grappling assembly comprises:

a first claw;

a second claw;

a pivot coupling;

a first spring directly coupled to the pivot coupling; and a second spring directly coupled to the pivot coupling, wherein each of the first spring and the second spring comprises:

a coiled portion wrapped around a portion of the pivot coupling;

a first linear segment forwardly extending from a first end of the coiled portion; and a second linear segment rearwardly extending from a second end of the coiled portion, wherein the first end is opposite from the second end.

19. A grappling assembly configured to connect to one or more arms of a utility component, wherein the grappling assembly comprises:

a first claw;

a second claw;

a first pivot coupling that pivotally couples the first claw to the second claw;

a second pivot coupling that pivotally couples a first portion of the first claw to a second portion of the first claw;

a third pivot coupling that couples a first portion of the second claw to a second portion of the second claw;

a first spring that directly couples to the first pivot coupling;

a second spring that directly couples to the second pivot coupling;

a third spring that directly couples to the third pivot coupling.

20. A grappling assembly configured to connect to one or more arms of a utility component, wherein the grappling assembly comprises:

a first claw;

a second claw;

one or more rods coupled to one or both of the first claw or the second claw;

one or more pivot couplings;

one or more springs coupled to one or more portions of the one or more rods, and one or more of the first claw, the second claw, or the one or more pivot couplings; and one or more caps secured to the one or more rods over the one or more springs.

21. The grappling assembly of claim 20, further comprising one or more pins removably secured to the one or more rods.

* * * * *